Nov. 29, 1927.

C. R. HUBBARD 1,651,277

PACKING

Filed July 11. 1925

INVENTOR:
Cecil R. Hubbard,
By Attorneys,
Fraser, Myers & Manley.

Patented Nov. 29, 1927.

1,651,277

UNITED STATES PATENT OFFICE.

CECIL R. HUBBARD, OF NEWARK, NEW YORK, ASSIGNOR TO THE GARLOCK PACKING COMPANY, OF PALMYRA, NEW YORK, A CORPORATION OF NEW YORK.

PACKING.

Application filed July 11, 1925. Serial No. 42,911.

This invention relates to improvements in packing of general application and is especially adapted for heavy service duty and to stand up under relatively wide and sudden variations of temperature and pressure.

It is an object of the invention to provide a packing of relatively simple and economical construction but of maximum durability, thereby reducing the necessity of frequent replacements.

In the drawings illustrating the preferred form of the invention:

The invention herein disclosed and claimed, in its broadest aspect, comprises a packing 10 (Fig. 4) consisting wholly or in part of laminated material, the laminations running lengthwise of the packing and having spaced marginal interruptions of continuity preferably in the form of recesses 11 (Figs. 4 and 5) in portions of the laminations exposed in one of its surfaces, the recesses in adjacent laminations being disposed in staggered relation. Preferably such laminated strip will be made of lead or other appropriate soft metal and used as a core of a composite packing illustrated in Fig. 5 having an outer casing 12 of asbestos fabric or other suitable fibrous material.

Figure 1:
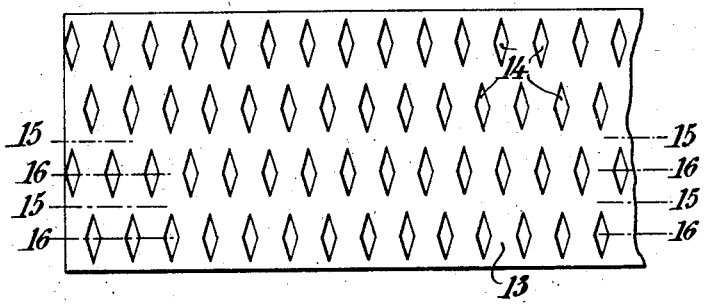
Figure 1 is a plan view of a perforated blank of material adapted for use in making the core of a packing embodying the invention.
Figure 2:
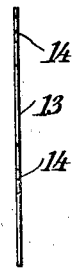
Fig. 2 is a transverse sectional view of the same.
Figure 3:
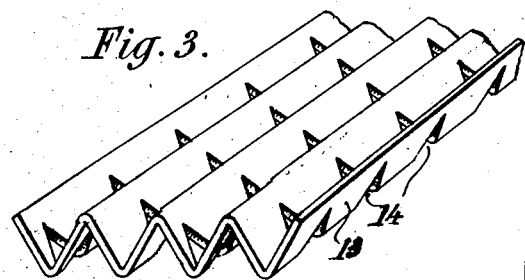
Fig. 3 is a view in perspective illustrating the blank shown in Fig. 1 after it has been partly folded as a part of the process of making the core.

In the form of the invention herein disclosed by way of illustration, the packing strip 10 is produced from a relatively thin strip 13 (Figs. 1 and 2) of lead or other suitable material perforated as indicated at 14, the perforations being disposed in parallel rows extending lengthwise of the strip. This strip of material is then creased along parallel lines 15, 15 and 16, 16, the latter being so disposed as to intercept the rows of perforations and the former so as to lie between the same. The parts of the creased strip are then folded upon themselves through the form indicated in Fig. 3 to the compact form illustrated in Fig. 4. These operations may be performed by appropriate machinery constituting no part of the present invention.

Figure 4:
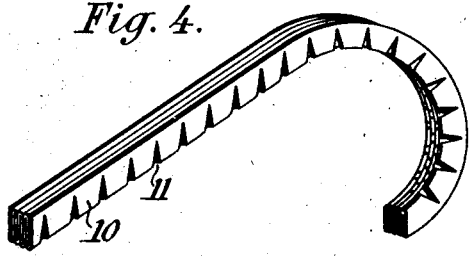
Fig. 4 is a view in perspective illustrating the completed core, one end being indicated as having been bent to a form adapted for insertion in a stuffing box.

It will be observed that the parts of the strip of material when folded in the above explained manner are so disposed in the finished product, illustrated in Fig. 4, as to produce series of spaced recesses in one of the surfaces of the packing. In preparing the strip (Fig. 1) the perforations of each row will preferably be staggered with respect to perforations of neighboring rows, as a result of which the recesses in the strip of material (Fig. 4) will be likewise staggered. This results in a very effective broken joint relation between the various folds the recesses in each of which lie between imperforate portions of the adjacent folds or laminations.

It will be apparent that the invention need not necessarily be limited to the form herein disclosed comprising a structure made from a single sheet of material, perforated and bent through the perforations. It is merely essential that the laminated structure comprise a multiplicity of mutually contacting layers of folded, thin, relatively soft sheet metal disposed edgewise with respect to the working surface of the packing, and that portions of the folded material be cut away of such form, size and location as to produce series of spaced marginal interruptions of continuity in staggered relation along the relatively thin elements of folded sheet material exposed at said working surface.

In the preferred form herein disclosed, the perforations are of diamond form having their longer axes disposed crosswise with respect to the lines 16, 16 along which the material is folded. This diamond-shaped form of perforation results in recesses in the finished material in the form of V-shaped notches, as best indicated in Fig. 4.

Although the packing may be used in the form illustrated in Fig. 4, the preferred form includes a casing 12 of asbestos or other fibrous material. One satisfactory form of casing may be prepared by first folding the edges of a strip of asbestos fabric or other suitable fibrous material inwardly, placing the core of laminated material along the meeting edges of the folded strip, and then turning the margins of the folded strip into contact with the side surfaces of the mass of laminated material which serves as a core. The various layers of the fibrous casing may be secured to each other and to the laminated core in any appropriate manner as by coating the surfaces with rubber cement prior to the folding operation.

Figure 5:
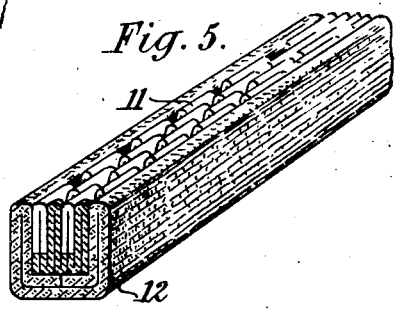
Fig. 5 is a view in perspective of a short length of completed packing of which the folded material of Fig. 4 is used as a core.
Figure 6:
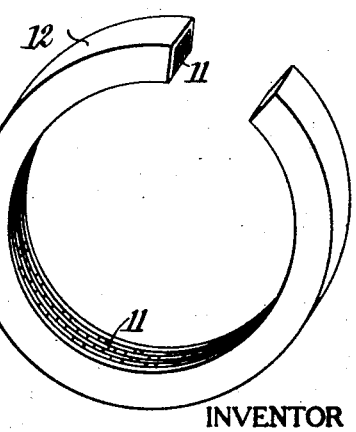
Fig. 6 is a view in perspective of a short length of packing embodying the invention bent into the form of a gasket, a portion thereof being removed in order to illustrate internal structure.

The composite packing illustrated in Fig. 5 may be readily bent to any desired radius, as clearly indicated in Fig. 6. The notches 11 in the inner surface of the core are slightly closed during the bending of the packing, this bending being facilitated by the lines of weakness at the base of the notched portions. The portions of the sheet material cut away to form the recesses should be of such size and form that the bending of the packing to the curvature of the rod with which it is to be used will not be prevented by a premature closing of the surface gaps before the desired degree of curvature has been attained. The broken joint arrangement between the notches of adjacent laminations of the core enhances the effectiveness of the packing, since steam, gases or other fluid is prevented from passing from the notches of one fold to the notches of the next fold because of the intervening imperforate portions of the folds which are maintained under relatively high pressure when the packing is held in compressed relation between the walls of a stuffing box or corresponding surfaces of the packed joint. The recesses or cavities in the exposed surface of the metal core form suitable and uniform containers for grease, graphite or other lubricants.

The invention is not intended to be limited to the specific form which has been selected for purposes of illustration but should be regarded as including modifications and variations within the scope of the appended claims.

What is claimed is:

1. A packing comprising a sheet of appropriate material having longitudinally disposed rows of perforations therein, said sheet being folded along lines some of which pass through said rows of perforations and thereby formed into a compact laminated mass having one surface provided with a series of spaced recesses separated by the folded portions of said sheet lying between said perforations.

2. A packing, substantially as defined by claim 1, of which the material used is an appropriate soft metal.

3. A packing, substantially as defined by claim 1, the material used being lead.

4. A packing, substantially as defined by claim 1, the perforations in the sheet being in the form of diamonds having their longer axes disposed crosswise of the folds, thereby forming V-shaped notches in the surface of the finished packing.

5. A packing, substantially as defined by claim 1, having the perforations of alternate rows in staggered relations whereby the recesses in the finished surface will also be staggered, the recesses of each fold lying between intervening imperforated portions of adjacent folds.

6. A packing, substantially as defined by claim 1, the sheet being folded alternately in opposite directions and having the alternate folds disposed between parallel rows of perforations through which the intervening folds are made.

7. A packing comprising a sheet of lead having longitudinally disposed rows of diamond-shaped perforations, said sheet being folded alternately in opposite directions along parallel lines passing in alternation through and between said rows of perforations and thereby formed into a compact laminated mass, the alternate rows of perforations being disposed in staggered relation with their longer axes crosswise of the folds, thereby forming V-shaped notches in one of the surfaces of the finished packing, the notches in alternate folds being staggered and lying between intervening imperforated portions of adjacent folds.

8. A packing, substantially as defined by claim 1, having a casing of fibrous material in which the laminated mass is embedded, said casing forming a backing and covering for all parts of said mass except the surface having recesses therein which is left exposed.

9. A laminated packing element comprising a multiplicity of mutually contacting layers of folded, thin, relatively soft sheet metal disposed edgewise with respect to its working surface, said folded material having portions cut away of such form, size and location as to produce series of spaced marginal interruptions of continuity in staggered relation along the relatively thin elements of folded material exposed at said working surface.

10. A laminated packing element comprising a multiplicity of mutually contacting layers of thin, relatively soft sheet metal disposed edgewise with respect to its working surface, said material having portions cut away of such form, size and location as to produce series of spaced, marginal interruptions of continuity in staggered relation along the relatively thin elements of sheet material exposed at said working surface.

In testimony whereof, I have hereunto signed my name.

CECIL R. HUBBARD.